March 8, 1949.                F. B. RECKER                2,463,643
                        SELF-UNLOADING VEHICLE BODY
Filed Nov. 1, 1946                                    3 Sheets-Sheet 1
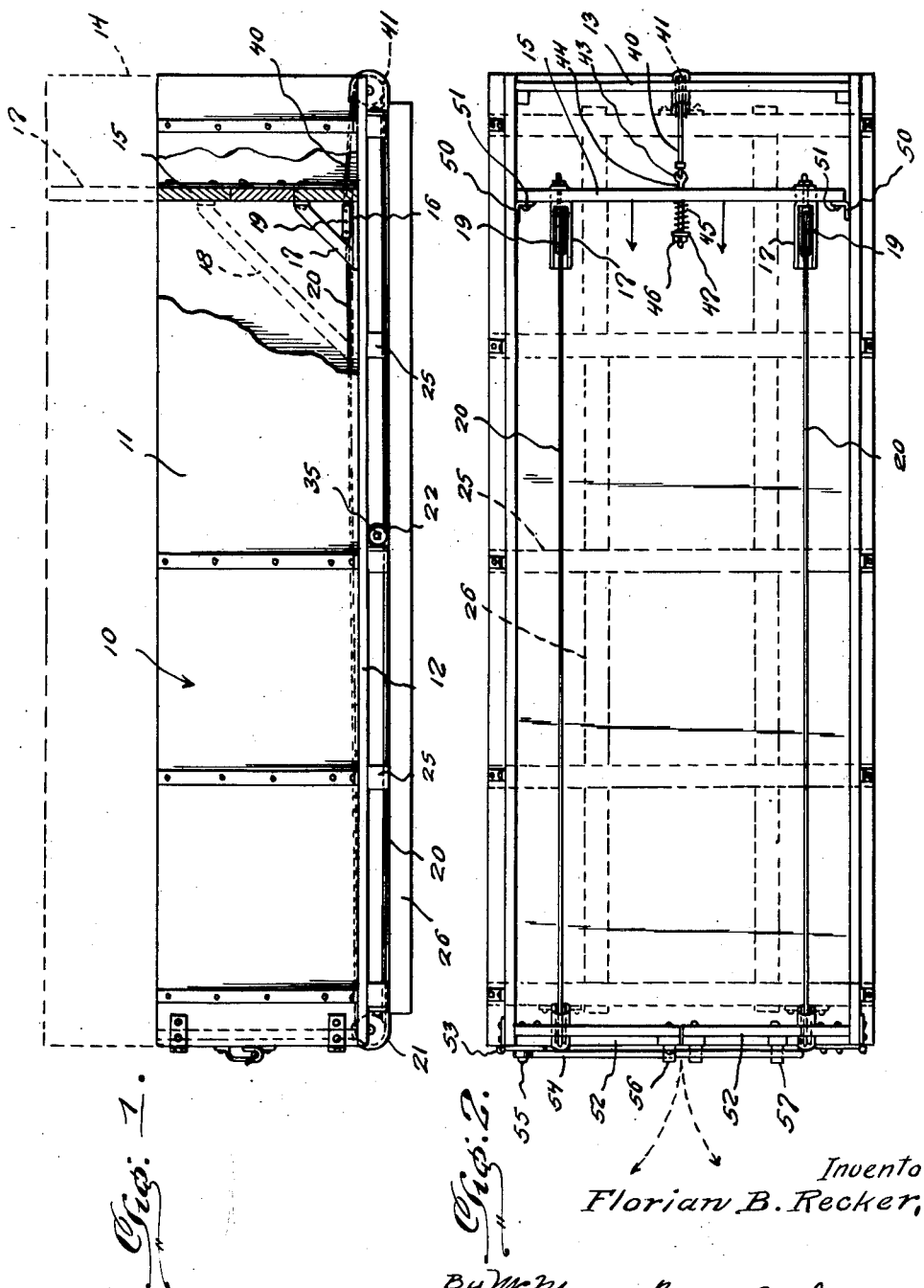

March 8, 1949. F. B. RECKER 2,463,643
SELF-UNLOADING VEHICLE BODY
Filed Nov. 1, 1946 3 Sheets-Sheet 2
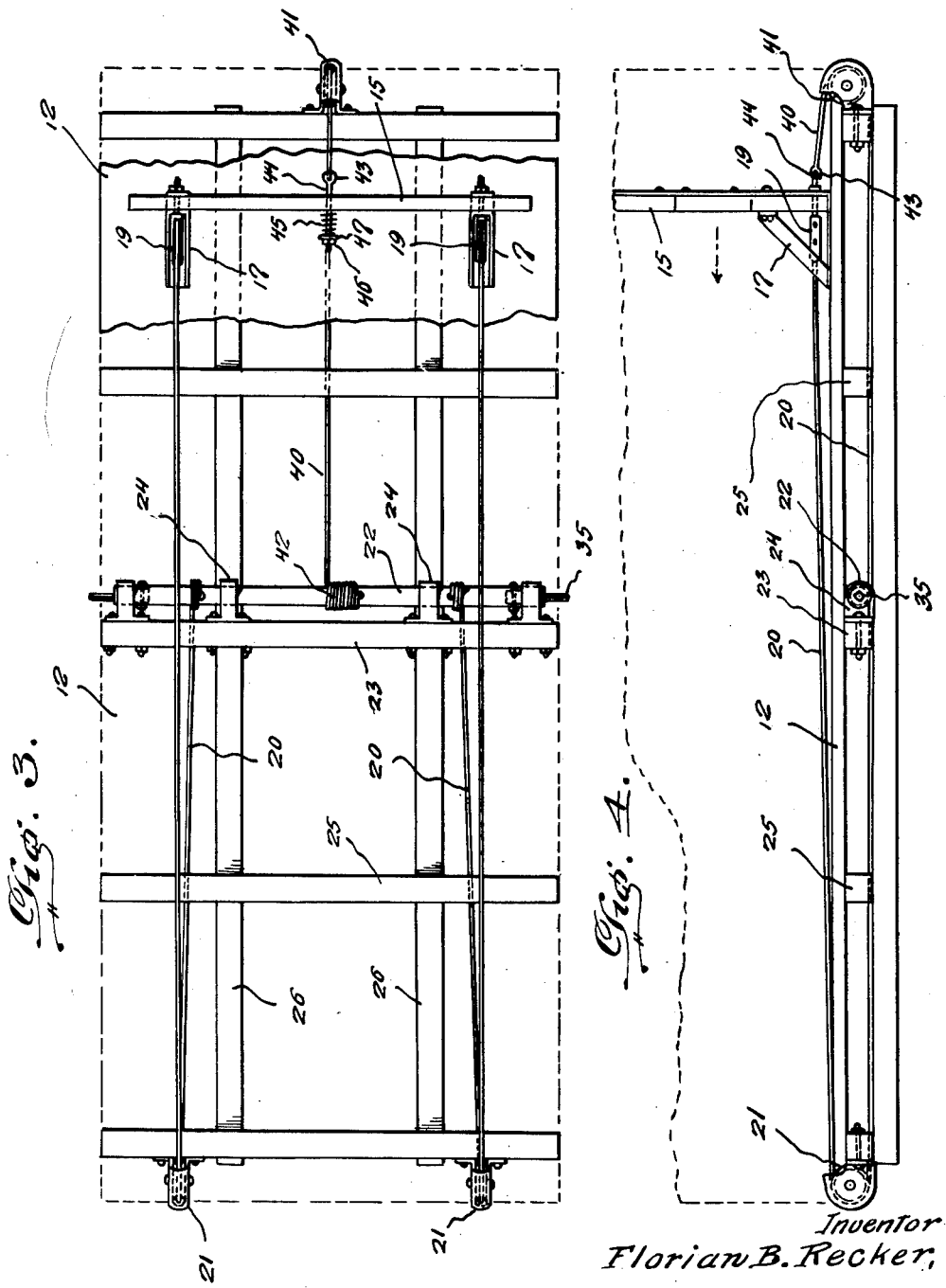
Inventor
Florian B. Recker,
By McMorrow, Berman & Davidson
Attorneys March 8, 1949. F. B. RECKER 2,463,643
SELF-UNLOADING VEHICLE BODY
Filed Nov. 1, 1946 3 Sheets-Sheet 3
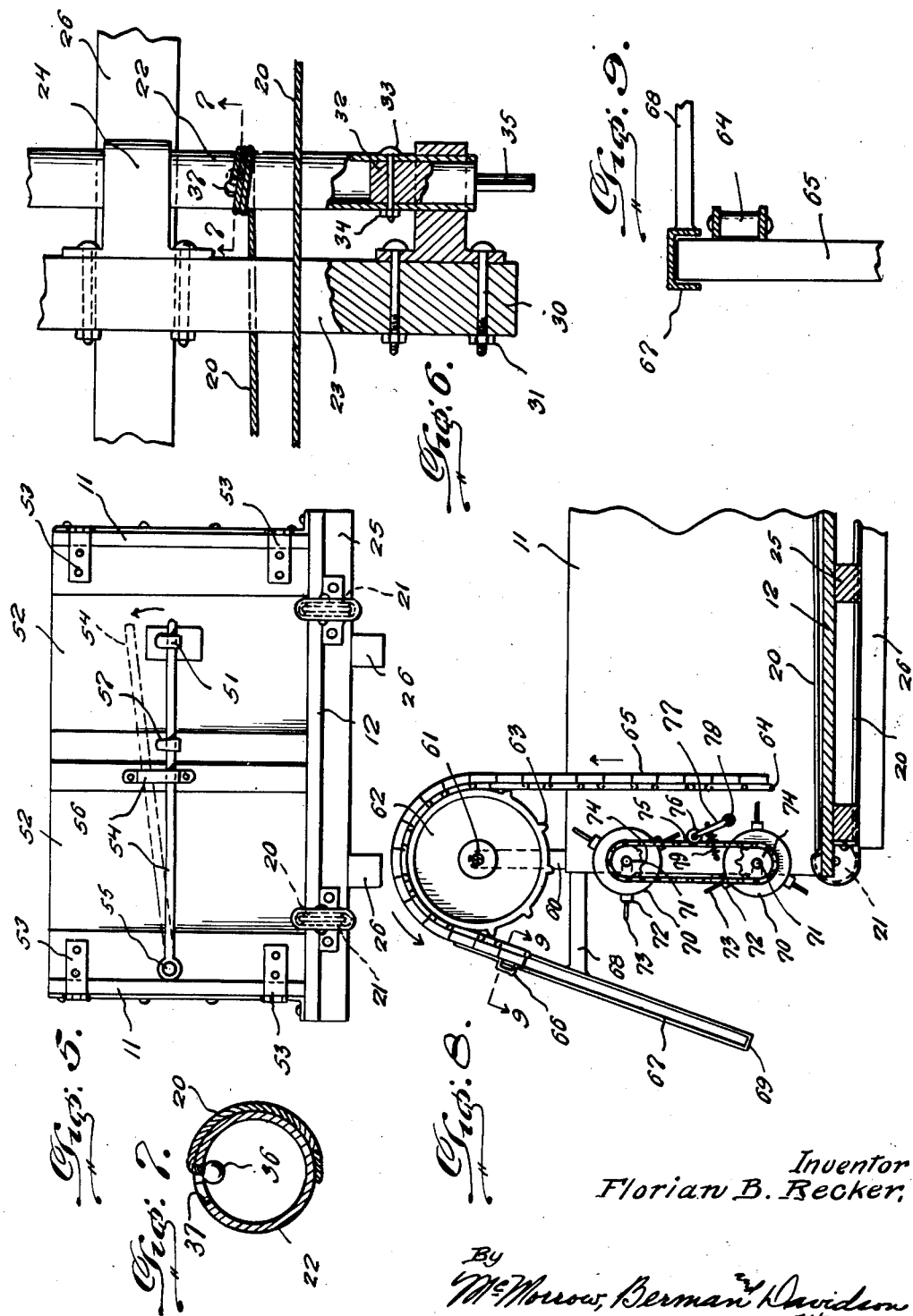
Inventor
Florian B. Recker,
By
McMorrow, Berman & Davidson
Attorneys Patented Mar. 8, 1949

2,463,643

UNITED STATES PATENT OFFICE 2,463,643

SELF-UNLOADING VEHICLE BODY

Florian B. Recker, Hopkinton, Iowa

Application November 1, 1946, Serial No. 707,105

9 Claims. (Cl. 214—82)

This invention relates to a vehicle body, and more particularly, to a vehicle body of the self-unloading type, especially adapted for wagons and the like.

A primary object of this invention is the provision of an improved self-unloading vehicle body characterized by means whereby the contents thereof may be unloaded with a minimum of difficulty and effort.

An additional object of the invention resides in the provision of such a vehicle body particularly adapted for use with wagons or the like, including a movable partition adapted to be moved rearwardly of the vehicle body to empty the contents thereof.

A further object of the invention resides in the provision of improved gate means adapted to be utilized in conjunction with such a vehicle body.

Still another object of the invention resides in the provision of such a device which is sturdy and durable in construction, reliable and efficient in operation, and relatively simple and inexpensive to manufacture, assemble and utilize.

Other objects will in part be obvious and in part be pointed out as the description of the invention proceeds, and shown in the accompanying drawings, wherein there are disclosed preferred embodiments of this inventive concept.

In the drawings:

Figure 1 is a side elevational view, partially broken away, showing one form of vehicle body embodying features of the instant inventive concept.

Figure 2 is a top plan view of the device of Figure 1.

Figure 3 is a bottom plan view of a vehicle body.

Figure 4 is a side view partially in elevation and partially in section disclosing constructional details.

Figure 5 is a rear elevational view of one form of body embodying features of the instant inventive concept.

Figure 6 is an enlarged fragmentary view, partially in section and partially in plan, disclosing a constructional detail.

Figure 7 is an enlarged sectional view taken substantially along the line 7—7 of Figure 6.

Figure 8 is a fragmentary detail view partially in section and partially in elevation disclosing a modified form of construction.

Figure 9 is an enlarged sectional view taken substantially along the line 9—9 of Figure 8, as viewed in the direction indicated by the arrows.

Similar reference characters refer to similar parts throughout the several views of the drawings.

Referring now to the drawings, there is generally indicated at 10 a vehicle body adapted to be utilized in conjunction with a wagon or the like, including side walls 11, a base 12, and a front end wall 13. The body is also provided with a tail gate for a rear end wall, to be more fully described hereinafter.

As best shown in Figure 1, the height of the side walls may be varied in accordance with the load carried, and supplemental side boards, as indicated at 14, may be positioned thereon if so desired in any conventional manner. Positioned within the body 10 is a movable end wall 15 provided at its base with angle irons 16, or the like, adapted to slide on the bed or base 12 of the wagon, and reinforcing members 17 adapted to hold the end member 15 upright. In the event that a wagon body of unusual height is utilized, a supplemental board 14 may be applied to the gate 15, and additional reinforcing braces 18 may also be provided if desired.

Adjacent the base of the member 15 are provided clamps 19 of any desired conventional type, and positioned on opposite sides thereof, to which are secured the extremities of cables 20 which extend substantially the full length of the body and extend about enclosed pulleys 21 and thence beneath the body to a rotatable member 22. As best shown in Fig. 3, the member 22 is secured to a transverse cross-member 23 and journaled for rotation in appropriate brackets 24 positioned upon the member 23.

Additional suitable transverse reinforcing members 25 extend across the base of the body, as best shown in Figure 3, and longitudinal supporting members 26 are also provided.

Having particular reference to Figures 6 and 7, it will be seen that the journals 24 are secured to the transverse frame member 23, as by means of bolts 30 and nuts 31, and that the member 22 is comprised of a tubular sleeve provided with end blocks 32 secured in position, as by bolts 33 and nuts 34, and which end blocks are secured to squared shafts 35 for the accommodation of a crank handle or the like. The ends of the cables 20 are provided, as best shown in Figure 7, with enlarged extremities 36, which may, if desired, comprise lead balls or the like, which are adapted to be inserted in keyhole apertures 37 in the tubular member 22, and, upon engagement with the reduced portion of such keyhole aperture, to be securely retained in position, whereby rotation of the member 22 by means of a crank applied to the squared shank 35, will cause the cables 22 to be wound thereabout, thus, by virtue of the pulleys 21, moving the end wall 15 rearwardly to force the contents of the vehicle body toward the rear or the tail gate thereof.

Means are also provided comprising a cable 40 for retracting the gate or movable member 15 after the contents of the vehicle have been emptied, and include a pulley 41 positioned at the forward end of the vehicle body, or opposite to the tail gate thereof, about which the cable 40 passes. The cable 40 is wound about the center of the tubular member 22, as indicated at 42, and secured thereupon in the same manner as the cable 20. The opposite extremity of the cable 40 is secured to an eye 43 comprising a portion of a shank 44 which passes through the gate 15, and on its opposite side is provided with a compression spring 45 secured in position by means of a nut 46 and washer 47, the arrangement being such that upon rotation of the member 22 in one direction, gate member 15 is moved forwardly, and upon rotation of the frame member in the opposite direction, the gate is retracted to its position adjacent the end 13 by means of the cable 40.

As best shown in Figure 2, the sides of the member 15 are provided with flange members 50 of rubber or the like secured in position, as by bolts 51, adapted to preclude passage of any material in the vehicle body past the gate 15 when the same is moved toward the rear of the body for the purpose of unloading the same.

Having reference now to Figure 5, there is disclosed one form of end gate, which includes two gate members 52 hingedly secured, as by hinges 53, to the side walls 11 of the body, and adapted to swing outwardly in the direction shown by the arrows in Figure 2. The gate members 52 are adapted to be retained in position, as by means of a bar 54 pivotally secured, as by a pivot 55, to one of the gate members, and extending through a bracket 56 on the same gate member engageable in lugs 57 on the opposite gate member. When the bar 54 is lifted to the dotted line position disclosed in Figure 5, it will be obvious that the gate may be opened, and the device unloaded by means of the gate member 15 in the manner previously described.

A modified form of end gate construction is disclosed in Figures 8 and 9, wherein the end of the vehicle is provided with supports 60 which carry an axle 61 upon which is rotatably mounted a drum 62, the ends of which are provided with sprockets including teeth 63. The teeth 63 are adapted to engage in links 64 of chains positioned on opposite sides of a plurality of gate slats 65. On the lowermost slat 65 handle members 66 are provided, and guide channels 67 positioned on opposite sides of the vehicle body are held in position, as by supports 68, in such manner that when the gate is rolled over the sprockets including the teeth 63, the same will be guided outwardly and lifted out of the vehicle body and stopped ultimately by the bottoms 69 of channel members 67. The operation should be obvious in consideration of Figure 8, in that when the gate is in the position shown a portion of the contents of the vehicle body may be unloaded, but when moved to the base of the channels 67, the gate will be fully opened. Conversely, when moved in an opposite direction, the end of the body will be completely closed.

As readily seen in said Figures 7 and 8, when the endgate is fully open so that it extends to the base of channels 67, as mentioned, the gate projects sufficiently far down beyond the beaters to prevent the contents being unloaded from the vehicle body past these beaters from being tossed or projected by the latter upwardly outward or beyond whatever hopper, conveyor or receptacle may be disposed at the rear of the vehicle body to receive the contents of the latter during unloading.

When the device is utilized in conjunction with a gate, such as above described, agitating means, or beaters, are provided in such manner that when the contents of the vehicle are unloaded, agitation thereof is produced substantially automatically. Such means comprise drums 70 journaled on axles 71 extending transversely across the vehicle body and positioned adjacent the base and the top thereof, respectively. The drums are provided with protuberances 72 from which emerge agitating fingers 73, the spacing being such that the fingers are provided with just sufficient clearance to permit passage thereof. Each drum 70 is provided with sprockets 74 at the extremities thereof, which sprockets are connected, as by means of a chain 75, in such manner that when one drum is rotated or driven by passage of material in the vehicle body thereagainst and thereover, or driven by other means, the other drum is simultaneously rotated by virtue of the chain. Chain tightening means are also provided and include a roller 76 mounted on a pivotally mounted arm 77, the pivot being indicated at 78, and biased, as by a spring 79, into engagement with the chain 75 in order to hold the same tightly to provide positive rotation of one drum when the other drum is rotated. Of course, it is self-evident that either of the beater shafts may be power operated by connecting a power-driven element thereto, or may be hand operated, if desired. As such operation is obvious upon mere mention thereof, it is thought to be superfluous to illustrate in specific detail.

Now, from the foregoing it will be apparent that there is herein provided an improved vehicle body provided with self-unloading features and including an improved tail gate construction, which accomplishes all the objects of this invention, and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative and not in a limiting sense.

What is claimed is:

1. In a vehicle, the combination of a body having a floor, a gate movable on said floor, cables secured to said gate, a rotatable member secured beneath said body, means securing the ends of said cable to said member for movement of said gate upon rotation of said member, an end gate for said vehicle body comprised of a plurality of slats, a chain secured to said slats, a rotatable drum mounted above said body, a sprocket on said drum engageable with said chain, and means for agitating the contents of said vehicle upon movement of the same by said gate, said last-mentioned means including interconnected drums having agitating fingers thereon.

2. In a vehicle, the combination of a body having a floor, a gate movable on said floor, cables secured to said gate, a rotatable member secured beneath said body, means securing the ends of said cable to said member for movement of said gate upon rotation of said member, an end gate for said vehicle body comprised of a plurality of slats, a chain secured to said slats, a rotatable drum mounted above said body, a sprocket on said drum engageable with said chain, and means for agitating the contents of said vehicle upon movement of the same by said gate, said last-mentioned means including interconnected drums having agitating fingers thereon, the interconnecting means including sprockets on said drums and a chain connection therebetween.

3. In a vehicle, the combination of a body having a floor, a gate movable on said floor, cables secured to said gate, a rotatable member secured beneath said body, means securing the ends of said cable to said member for movement of said gate upon rotation of said member, an end gate for said vehicle body comprised of a plurality of slats, a chain secured to said slats, a rotatable drum mounted above said body, a sprocket on said drum engageable with said chain, and means for agitating the contents of said vehicle upon movement of the same by said gate, said last-mentioned means including interconnected drums having agitating fingers thereon, the interconnecting means including sprockets on said drums and a chain connection therebetween, and means for tensioning said chain.

4. In a vehicle, the combination of a body having a floor, a gate movable on said floor, cables secured to said gate, a rotatable member secured beneath said body, means securing the ends of said cable to said member for movement of said gate upon rotation of said member, an end gate for said vehicle body comprised of a plurality of slats, a chain secured to said slats, a rotatable drum mounted above said body, a sprocket on said drum engageable with said chain, means for agitating the contents of said vehicle upon movement of the same by said gate, said last-mentioned means including interconnected drums having agitating fingers thereon, the interconnecting means including sprockets on said drums and a chain connection therebetween, and means for tensioning said chain, said last-mentioned means including a spring-biased roller abutting said chain.

5. In a vehicle comprising a body having a floor, a gate movable on said floor, cables secured to said gate, a rotatable member supported beneath the body, and means securing the ends of the cable to the rotatable member for causing movement of said gate upon rotation of the latter, the features including an endgate for said body comprising a series of slats, a chain attached to the slats, a rotatable drum mounted above the end of said body and extending beyond the latter in a position to direct the upper end of the series of slats or endgate out beyond the end of said body, a sprocket on the drum, and a pair of guide members mounted upon said end of the body beyond the latter for receiving said upper end of said series of slats when said endgate is open by raising the lower end of said series of slats.

6. In a vehicle comprising a body having a floor, a gate movable on said floor, cables secured to said gate, a rotatable member supported beneath the body, and means securing the ends of the cable to the rotatable member for causing movement of said gate upon rotation of the latter, the features including an endgate for said body comprising a series of slats, a chain attached to the slats, a rotatable drum mounted above the end of said body and extending beyond the latter in a position to direct the upper end of the series of slats or endgate out beyond the end of said body, a sprocket on the drum, and a pair of downwardly and rearwardly-inclined channel members forming guides fixed upon said end of the body beyond the latter for receiving said upper end of said series of slats when said endgate is open by raising the lower end of said series of slats.

7. In a vehicle comprising a body having a floor, a gate movable on said floor, cables secured to said gate, a rotatable member supported beneath the body, and means securing the ends of the cable to the rotatable member for causing movement of said gate upon rotation of the latter, the features including an endgate for said body comprising a series of slats, a chain attached to the slats, a rotatable drum mounted above the end of said body and extending beyond the latter in a position to direct the upper end of the series of slats or endgate out beyond the end of said body, a sprocket on the drum, a pair of downwardly and rearwardly-inclined guide members fixed upon said end of the body beyond the latter for receiving said upper end of said series of slats when said endgate is open by raising the lower end of said series of slats within the end of said body, and plural means for agitating the contents of said vehicle upon movement of the same by said gate mounted in said end of said body beneath said drum and exteriorly of said lower end of said series of slats.

8. In a vehicle, the combination of a body having a floor, a gate movable on said floor, cables secured to said gate, a rotatable member secured beneath said body, means securing the ends of said cable to said member for movement of said gate upon rotation of said member, an end gate for said vehicle body comprising a series of slats, a chain attached to the slats, a rotatable drum mounted above the end of said body in effective position to direct the upper end of said series of slats out beyond the end of said body, a sprocket rotatable with said drum engageable with said chain, and agitating means mounted upon said body operable when said endgate is raised or opened including a rotatable beater drum spaced a predetermined short distance above the end of said floor and having a plurality of agitating fingers projecting therefrom, a sprocket rigidly rotating with said beater drum, a further beater drum rotatably mounted a predetermined distance above the first-mentioned beater drum also having a plurality of agitating fingers projecting therefrom, a further sprocket rigidly rotatable with the further beater drum, and a chain interconnecting both the last-mentioned sprockets on the beater drums, in order to cause rotation of the further beater drum with the first-mentioned beater drum.

9. In a vehicle, the combination, with a body having a floor and means for propelling along the floor material to be unloaded from one end of the vehicle body which forms the unloading end thereon, of an endgate for said vehicle body comprising a series of slats, a chain attached to the latter, a drum rotatably mounted above the mentioned one end of the vehicle body in effective position to direct the upper end of the series of slats out beyond the end of said vehicle body, a sprocket rigidly rotatable with the drum engageable with the chain, a pair of rearwardly and downwardly-directed slat guide members fixed upon said vehicle body beyond said one end thereof for receiving said series of slats in fully open position of the endgate, and driven agitating means mounted upon said vehicle body and adapted to operate when said endgate is raised or opened, including a driven rotatable beater drum spaced a predetermined limited distance above the unloading end of said floor and having a plurality of agitating fingers projecting therefrom, a second sprocket rigidly rotating with said beater drum, a further beater drum rotatably mounted a predetermined limited distance above the first-mentioned beater drum and also having a plurality of agitating fingers projecting therefrom, a further sprocket rigidly rotatable with the further beater drum, and a chain interconnecting the second and further sprocket on the beater drum in order to cause rotation of the further beater drum with the first-mentioned beater drum, the slat guide members extending a sufficient distance down beyond the beater drums to cause said endgate in fully open position to deflect and prevent material being unloaded from being projected rearwardly upward or outward beyond a predetermined limited distance rearwardly of the unloading end of said vehicle body.

FLORIAN B. RECKER.

REFERENCES CITED

The following references are of record in the file of this patent:

UNITED STATES PATENTS

| Number | Name | Date |
|---|---|---|
| 622,957 | Kramer et al. | Apr. 11, 1899 |
| 873,030 | Dennis et al. | Dec. 10, 1907 |
| 946,321 | Bergren | Jan. 11, 1910 |
| 1,251,372 | Hewitt | Dec. 25, 1917 |
| 1,255,052 | Randall | Jan. 29, 1918 |
| 1,304,026 | Craymer | May 20, 1919 |
| 1,725,750 | Brinton | Aug. 27, 1929 |
| 1,729,825 | Gaiser | Oct. 1, 1929 |
| 1,927,653 | Wehr | Sept. 19, 1933 |
| 2,027,278 | La Marsh | Jan. 7, 1936 |
| 2,263,748 | Webb et al. | Nov. 25, 1941 |
| 2,297,089 | Walsh | Sept. 29, 1942 |